Jan. 2, 1962  R. C. SAVAGE  3,015,339
FLUID PRESSURE CONTROL MECHANISM
Filed July 8, 1958  2 Sheets-Sheet 1

INVENTOR
RUSSELL C. SAVAGE

Scrivener & Parker
ATTORNEYS

Jan. 2, 1962  R. C. SAVAGE  3,015,339
FLUID PRESSURE CONTROL MECHANISM
Filed July 8, 1958  2 Sheets-Sheet 2

INVENTOR
RUSSELL C. SAVAGE

BY Scrivener & Parker
ATTORNEYS

United States Patent Office 3,015,339
Patented Jan. 2, 1962

3,015,339
FLUID PRESSURE CONTROL MECHANISM
Russell C. Savage, Elyria, Ohio, assignor to Bendix-Westinghouse Automotive Air Brake Company, Elyria, Ohio, a corporation of Delaware
Filed July 8, 1958, Ser. No. 747,160
8 Claims. (Cl. 137—102)

This invention relates to control mechanisms and more particularly to a mechanism for controlling the operation of valve devices for governing mechanisms such as compressor unloaders and the like in response to predetermined high and low pressures in a fluid pressure system.

A principal object of the present invention is the provision of an improved control mechanism which is particularly, though not exclusively, useful for controlling the operation of a compressor unloader in response to predetermined high and low pressures in a reservoir of a fluid pressure system.

More particularly, an object of the present invention is the provision of an improved control mechanism for unloaders and the like which incorporates novel snap-acting mechanism movable in response to predetermined pressures in a fluid pressure system for rapidly admitting or exhausting actuating pressure to or from the unloader or other mechanism to be controlled.

A more specific object of the invention is the provision of control mechanism of the foregoing type wherein the snap action is achieved, in part, through a novel arrangement of linkages and an over-center snap-acting spring.

Other objects and their attendant advantages will become apparent from the following description wherein.

Figure 1:
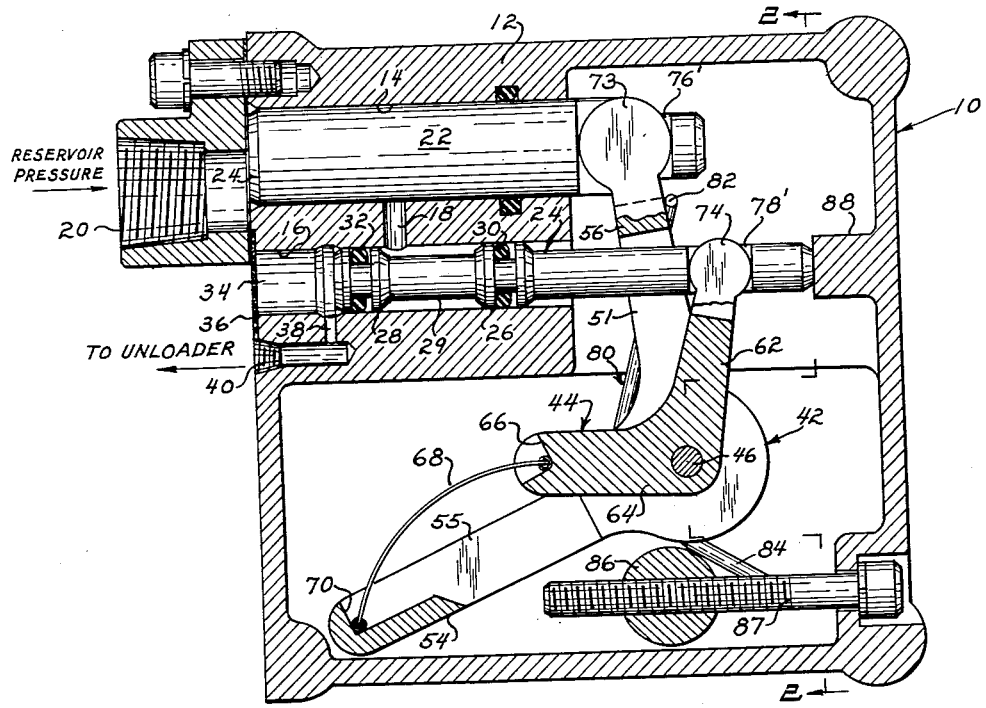
FIG. 1 is a vertical cross-sectional view of the control mechanism of the present invention.

Referring now to the drawings, the control mechanism illustrated is shown as it would be adapted for use with a fluid pressure system which includes (not shown) a continuously operating compressor, a reservoir, and an unloader mechanism adapted to retain the compressor inlet valve in an open position when the reservoir pressure exceeds a predetermined high value and to permit normal operation of the valve when the reservoir pressure falls to a predetermined low value. Though the invention is illustrated and described in connection with governing a compressor, as the description proceeds it will become apparent that the mechanism is suitable for a variety of uses, as for example, to effect rapid exhaustion during emergency conditions of an air brake system emergency line for automatic setting of the trailer brakes.

Referring to FIG. 1, the mechanism of the invention comprises a housing 10 having a valve block portion 12 containing a pair of parallel cylindrical chambers 14, 16 interconnected by a passageway 18. Chamber 14 is connected at one end to an inlet port 20 leading to the reservoir (not shown) of the fluid pressure system and slidingly contained in chamber 14 is a piston 22 whose inner face 24 is adapted to be subjected to reservoir pressure entering port 20.

Chamber 16 slidingly contains a valve member 24 of the spool variety having two spaced lands 26, 28 interconnected by a portion 29 of less diameter than the chamber 16. Though the lands may partake of any form, preferably each land is annularly recessed with each recess being adapted to contain an O-ring 30, 32 respectively, as shown. The space occupied by portion 29 between lands 26, 28 is at all times in communication with passage 18 with O-ring 30 serving as a seal for the right hand end of chamber 16. The left hand end of chamber 16 is open to atmosphere through a port 34 which may be provided with a suitable filter such as the screen 36 shown. The O-ring 32 is adapted to control a passageway 38 leading to a port and passage 40 connected to the compressor unloader with the land O-ring 32 alternately connecting passage 38 to atmosphere through port 34 or to passage 18 depending on whether the valve 24 is in the loading position of FIG. 1 or the unloading position of FIG. 3.

To achieve extremely rapid movement of the unloader mechanism between loaded and unloaded positions, the present invention provides snap-acting mechanism which is responsive to movement of piston 22 in accordance with pressure conditions prevailing in the reservoir. The snap-acting mechanism of the invention comprises a pair of bell cranks 42, 44 pivoted on a common shaft 46 secured in suitably drilled passageways in laterally opposed bosses 48, 50 which may be integrally attached to the side walls of housing 10 as shown in FIG. 2.

Figure 4:
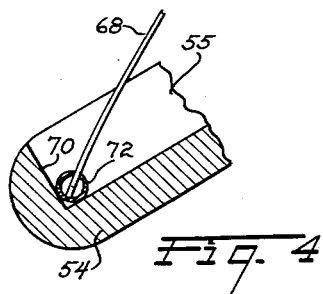
FIG. 4 is an enlarged detailed view of a portion of the control mechanism.

The upper limb 51 of bell crank 42 is operatively connected to piston 22 with the bell crank being constructed essentially of two identical spaced members 52, 53 (see FIG. 2) integrally joined to each other at their opposite ends as by a portion 54 at the end of lower limb 55 and by a portion 56 just below the upper end of limb 51. With this construction a recess 60 is provided between the portions 52, 53 of bell crank 42 for the reception of the smaller bell crank 44 whose upper limb 62 is operatively connected to valve member 24 and whose lower limb 64 is recessed as shown at 66 to receive one end of an over center leaf spring 68 whose opposite end is received in a suitably constructed recess 70 formed in portion 54 connecting the members 52, 53 of bell crank 42. The ends of the spring 68 are mounted for pivotal movement with respect to recesses 66, 70 by means of slotted cylindrical bearing members 72 adapted to have a rolling two-point engagement with adjacent sides of the recesses as clearly shown in FIG. 4.

Figure 2:
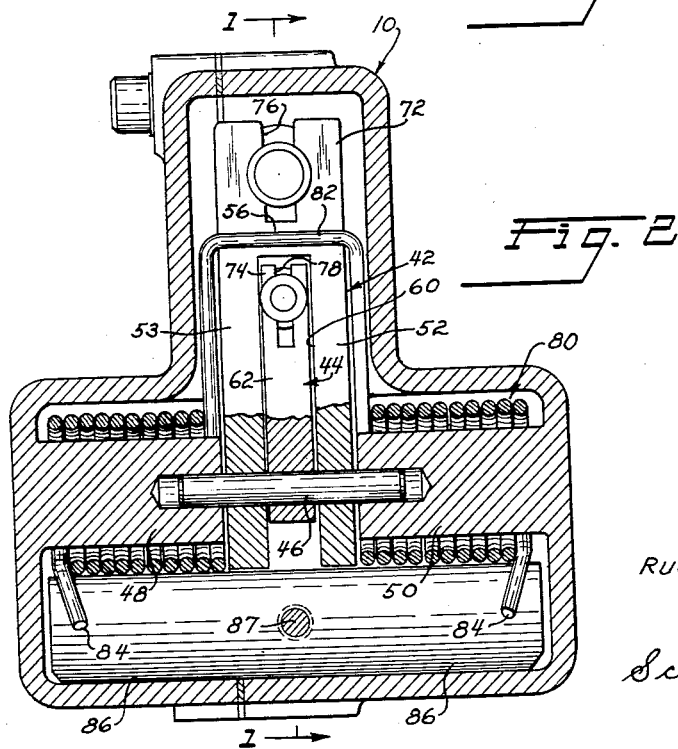
FIG. 2 is a vertical cross-sectional view taken substantially on the line 2—2 of FIG. 1.

As illustrated in FIG. 2, the bell cranks 42, 44 are connected to the piston 22 and valve 24 in a similar fashion with bifurcated upper ends 73, 74 of the respective upper limbs 51, 62 being rounded and provided with slots 76, 78 adapted to embrace opposed recesses 76', 78' on opposite sides of the ends of piston 22 and valve member 24. The rounded portions of the ends 73 and 74 engage the sides of the recesses 76, 78 in a rolling relationship permitting smooth linear movement of the piston and valve members while the bell cranks move pivotally about shaft 46.

The piston 22, and hence the valve member 24, are normally retained in the no-air position of FIG. 1 by means of a torsion spring 80 having an upstanding central portion 82 engaging the upper limb 51 of bell crank 42 and end portions 84 engaged over a cylindrical abutment 86 which may be moved by means of an adjusting screw 87 so as to regulate the force with which the upstanding portion 82 acts on the bell crank 42 which force in turn determines the reservoir pressure required to move piston 22 in opposition to the spring pressure, or, in other words, determines the governor setting.

In operation, assuming the parts of the invention in the no-air position of FIG. 1, piston 22 is retained in its left hand position by spring 80 and the valve member 24 is positioned with its extreme right end abutting a stop 88 integral with the wall of chamber 10 so as to connect the unloader to atmosphere through passage 38 and port 34. As the reservoir pressure approaches the governor setting, piston 22 commences to move to the right in FIG. 2 causing bell crank 42 to rotate clockwise against spring 68 and lift the left hand end of spring 68 to a position where it is first in alignment with and then slightly above the line formed by the center of shaft 46 and the right hand end of the spring where it engages the recess 66 of bell crank 44. Upon this occurrence, the spring 68 produces a counterclockwise force on bellcrank 44 which force is exerted with a snap action so that bellcrank 44 is pivoted in a counterclockwise direction moving valve member 24 to its left position of FIG. 3 so as to connect the unloader connection 40 with the reservoir inlet port 20 through cylinder 14, passage 18, valve chamber 16, and passage 38. Immediately upon this occurrence, reservoir pressure flows to the unloader to unload the compressor.

Figure 3:
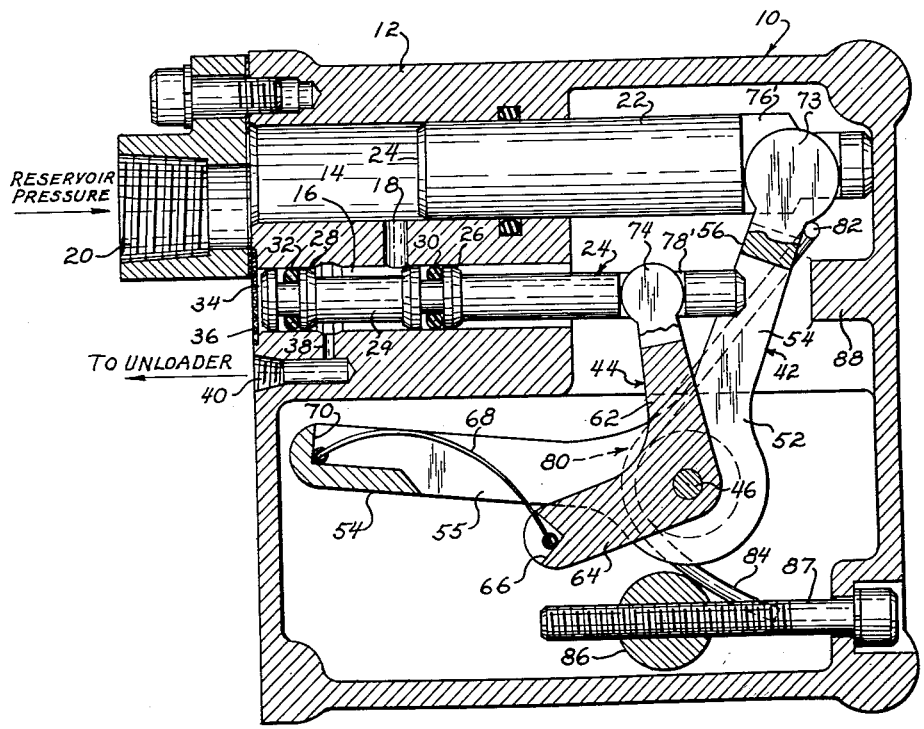
FIG. 3 is a view similar to FIG. 1 but showing the parts of the invention in changed position.

The parts of the governor remain in the position of FIG. 3 so long as the reservoir pressure acting on piston 24 exceeds the force of spring 80. As the reservoir pressure falls below the setting of spring 80, this acts on bell crank 42 to move it counterclockwise in FIG. 3 and move piston 22 toward the left with continued movement of bell crank 42 bringing the left hand end of leaf spring 68 into alignment with and then slightly below the line formed by the center of shaft 46 and the right hand end of the spring so that the spring now exerts a clockwise force on bell-crank 44 to move it and valve 24 rapidly with a snap action to the position of FIG. 1 thereby connecting the unloader connection 40 to atmosphere through passage 38 and port 34, thus loading the compressor.

Though the governor of the invention has been described in its application to controlling a compressor unloader, it will be apparent to those skilled in the art that by merely adjusting the force exerted by spring 80, the governor of the invention could act as a low pressure valve for exhausting the emergency line of a tractor trailer fluid pressure brake system so as to cause an automatic setting of the trailer brakes when the tractor reservoir pressure falls below a minimum safe value. When employed for such use, those skilled in the art will recognize that the emergency line pressure would be connected to the port 40.

From the foregoing description, it will be understood that the governor of the invention is susceptible of a wide variety of uses not limited to the specific uses mentioned and it will be apparent that the mechanism need not be restricted to the precise form shown and described but is susceptible of various modifications without departing from the scope of the appended claims.

What is claimed is:

1. A fluid pressure governor, comprising a housing having a cylinder therein and a valve chamber having a fluid connection with said cylinder, a fluid pressure inlet port for said cylinder, an outlet port for said valve chamber, an atmospheric port connected to said valve chamber, a valve in said chamber movable between a first position connecting said chamber to said outlet port and a second position connecting said outlet port to said atmospheric port, a piston in said cylinder exposed at all times to the pressure at said inlet port, said piston being movable between a first position and a second position, a bell crank pivoted in said housing and having one limb operatively connected to said piston, a second bell crank pivoted in said housing and having one limb operatively connected to said valve, an over-center snap-acting spring operatively connected between the corresponding opposite limbs of said bell cranks and arranged to urge said bell cranks in opposite directions so that when said piston is in its first position said valve is in its second position and vice versa, and a second spring acting on said piston in opposition to the fluid pressure at said inlet so as to normally urge said piston towards its first position.

2. A fluid pressure governor comprising a housing having a cylinder therein and a slide valve housing arranged in parallel relationship with said cylinder, a fluid passage connecting said cylinder and said chamber, a fluid pressure inlet port for said cylinder, an outlet port for said valve chamber, an atmospheric port connected to said valve chamber, a slide valve in said chamber movable between a first position connecting said chamber to said outlet port and a second position connecting said outlet port to said atmospheric port, a piston in said cylinder having one end exposed at all times to the pressure at said inlet port, said piston being movable between a first position and a second position, a bell crank pivoted in said housing and having one limb operatively connected to said piston, a second bell crank pivoted in said housing and having one limb operatively connected to said valve, and an over-center snap-acting spring operatively connected between the corresponding opposite limbs of said bell cranks and arranged to urge said bell cranks in opposite directions so that as said piston moves between its two positions, said spring is moved over-center to move said valve in the opposite sense to said piston with a snap action.

3. The combination of claim 2 including a second spring acting on said piston in opposition to the fluid pressure at said inlet.

4. The combination of claim 2 wherein the opposite limb of said second bell crank is shorter than the corresponding limb of said first bell crank and said over-center spring is a leaf spring.

5. The combination of claim 2 wherein said second bell crank is smaller than said first bell crank with both being pivoted on a common shaft.

6. Actuating mechanism for effecting snap action movement at a movable element in response to an applied force comprising a pair of bell cranks each movable between two positions and being independently and rotatably supported on a common axis, said bell cranks being arranged that upon rotation in opposite directions at least one of the arms of one bell crank moves past the corresponding arm of the other bell crank, one of said last named arms being shorter than the other, over-center spring means interposed between said last mentioned arms and urging said bell cranks in opposite directions so as to movably retain each bell crank in one of its two positions, means connecting said movable element to the other arm of one of the bell cranks, and means for applying a force to the corresponding arm of the other bell crank to move said bell crank from one of its positions towards its other position so as to move the spring-engaged arm thereof past the spring-engaged arm of the other bell crank to effect movement of the latter from its first to its second position with a snap action.

7. The actuating mechanism of claim 6 wherein the bell crank having the longer spring-engaged arm is centrally slotted in a plane perpendicular to the axis of rotation of said bell crank, and wherein the bell crank having the shorter spring-engaged arm operates within the slot of the other of said bell cranks.

8. The actuating mechanism of claim 6 including second spring means normally acting on one of said bell cranks to resist movement thereof.

References Cited in the file of this patent
UNITED STATES PATENTS

| 1,210,706 | Schwarty | Jan. 2, 1917 |
| 1,579,241 | Papashvili | Apr. 6, 1926 |
| 2,253,552 | Burch | Aug. 26, 1941 |
| 2,339,378 | Clench et al. | Jan. 18, 1944 |
| 2,521,015 | McLaren et al. | Sept. 5, 1950 |
| 2,539,977 | Straude | Jan. 30, 1951 |
| 2,804,878 | Fishwood et al. | Sept. 3, 1957 |

FOREIGN PATENTS

| 993,257 | France | Oct. 29, 1951 |